United States Patent
Oh

(10) Patent No.: US 6,738,936 B2
(45) Date of Patent: May 18, 2004

(54) METHOD FOR TESTING COMMUNICATION LINE TO LOCATE FAILURE ACCORDING TO TEST POINT PRIORITIES IN COMMUNICATION LINE MANAGEMENT SYSTEM

(75) Inventor: Chang-Sei Oh, Seoul (KR)

(73) Assignee: Korea Telecom, Kyoungki-do (KR)

(*) Notice: Subject to any disclaimer, the term of this patent is extended or adjusted under 35 U.S.C. 154(b) by 466 days.

(21) Appl. No.: 09/739,047

(22) Filed: Dec. 15, 2000

(65) Prior Publication Data

US 2002/0040453 A1 Apr. 4, 2002

(30) Foreign Application Priority Data

Oct. 4, 2000 (KR) ........................................ 2000-58246

(51) Int. Cl.[7] .............................................. G01R 31/28
(52) U.S. Cl. ...................................................... 714/716
(58) Field of Search .................................. 714/712, 716; 370/395.1, 241–247, 486, 290, 252, 382; 379/22–29, 14–14.01

(56) References Cited

U.S. PATENT DOCUMENTS 4,081,613 A * 3/1978 Reines et al. ............... 379/290

6,411,623 B1 * 6/2002 DeGollado et al. ......... 370/395.1

OTHER PUBLICATIONS

Ta–Kang Ma et al. "An integrated model– and rule–based approach to design of automatic switching for subtransmission lines; Power Industry Computer Application Conference Proceedings; pp. 320–326; May 7, 1993".*

* cited by examiner

Primary Examiner—Phung M. Chung
Assistant Examiner—Guy Lamarre
(74) Attorney, Agent, or Firm—Blakely, Sokoloff, Taylor & Zafman

(57) ABSTRACT

A method for locating a failure of a communication line according to self-adjusted priorities of the test points in the order of high failure probability in a communication line management system, includes the steps of organizing the test points, information on the test history of the test points, and test point search priorities (TSPs) representing the priorities of the test points in the order of high failure probability into a test database, searching the test database to determine the testing order of the test points according to the TSPs, testing the test points in the testing order to locate the failure, and revising the values of the data fields of the TSPs according to the test results and the location of the failure.

5 Claims, 9 Drawing Sheets

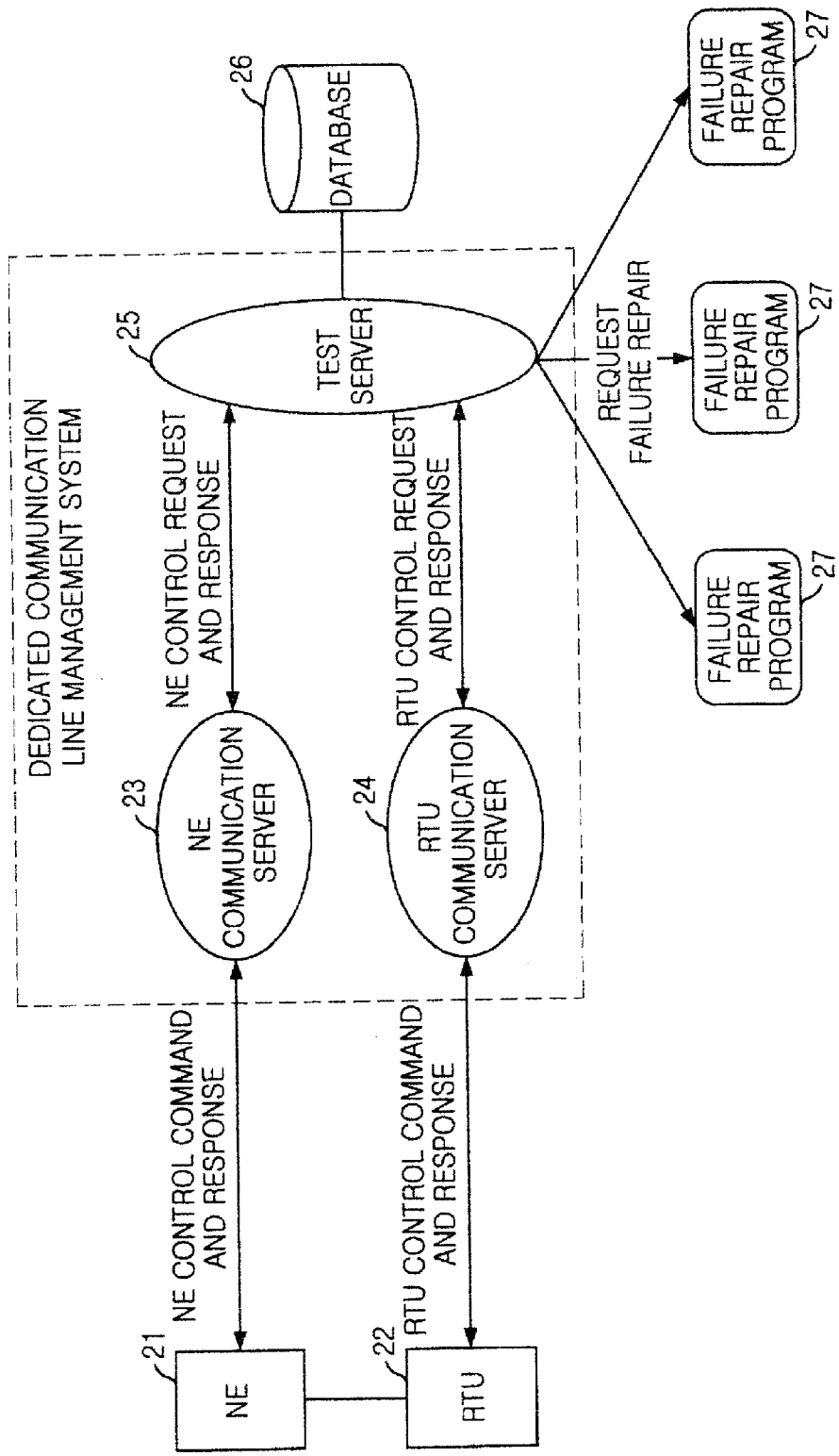

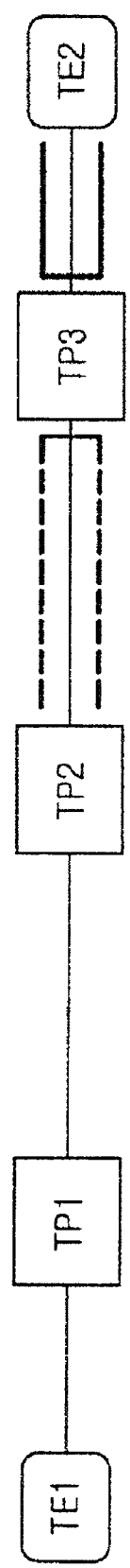
FIG. 3C
FIG. 3D

FIG. 4C

| TP₁ INFORMATION | TP₂ INFORMATION | ... | TP_{n-1} INFORMATION | TP_n INFORMATION |
|---|---|---|---|---|
| NE₁ RTU₁ INFORMATION | NE₂ RTU₂ INFORMATION | ... | NE_{n-1} RTU_{n-1} INFORMATION | NE_n RTU_n INFORMATION |

FIG. 4D

| TP₁ | TP₂ | ... | TP_{n-1} | TP_n |
|---|---|---|---|---|
| 3 | 4 | ... | 2 | 5 |

FIG. 4E

| $TP_1$ | $TP_2$ | ... | $TP_{n-1}$ | $TP_n$ |
|---|---|---|---|---|
| 2000/07/11 11:23:47 | 2000/07/09 15:38:02 | ... | 2000/07/11 11:25:18 | 2000/07/10 09:09:10 |

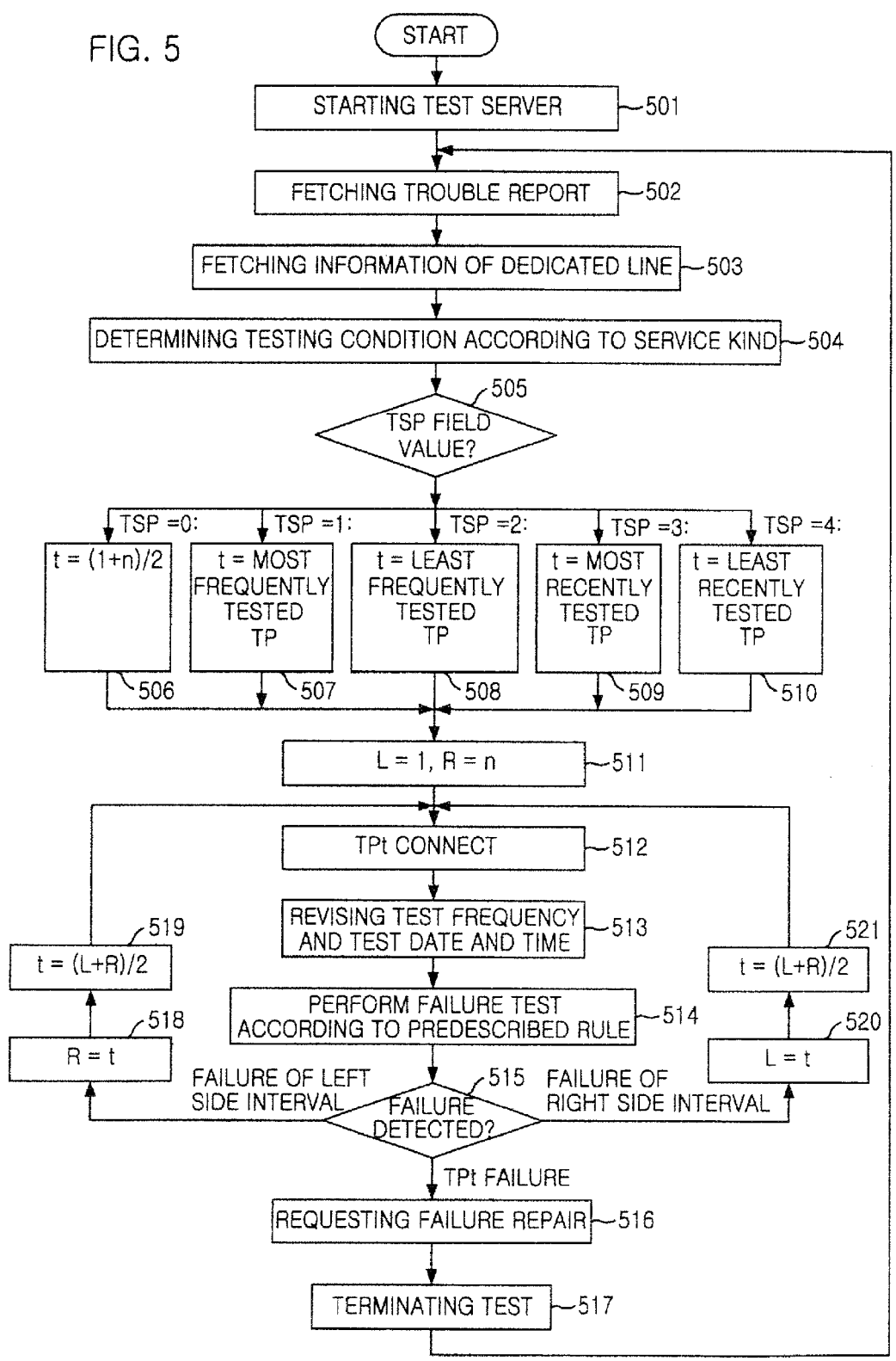

METHOD FOR TESTING COMMUNICATION LINE TO LOCATE FAILURE ACCORDING TO TEST POINT PRIORITIES IN COMMUNICATION LINE MANAGEMENT SYSTEM

FIELD OF THE INVENTION

The present invention relates to a method for locating a failure of a communication line in a communication line management system, and more particularly to a method for testing a communication line according to self-adjusted test point priorities in a communication line management system, which automatically determines the order of testing the points for locating a failure.

PRIOR ART OF THE INVENTION

Conventionally, the dedicated communication network provides dedicated communication lines with remote test units (RTUs) respectively connected to the equipments of their telephone office to test their failures. Hence, when the telephone office receives a trouble report from a subscriber of a dedicated communication line, an operator tests the RTUs connected with the dedicated line to locate a failure, and notifies an engineer in charge to repair it.

Hence, such conventional test method depends on the experience, capability and arbitrary judgment of the operator to locate the failure, so that the time taken for locating it is prolonged or shortened depending on the abilities of the operators and the number of operators participating in the test. This method is not desirable in the present environment requiring a great number of high-speed dedicated communication lines especially for Internet.

SUMMARY OF THE INVENTION

It is an object of the present invention to provide a dedicated communication line management system with a method for automatically testing a dedicated communication line that eliminates the manual testing to locate a failure.

It is another object of the present invention to provide a dedicated communication line management system with a method for automatically testing a dedicated communication line according to priorities of the test points in the order of high failure probability so that the test interval to locate a failure may be narrowed in a time as short as possible.

It is still another object of the present invention to provide a dedicated communication line management system with a recording medium programmed by a computer to perform the inventive method.

According to an aspect of the present invention, there is provided a method for locating a failure of a communication line according to self-adjusted priorities of the test points in the order of high failure probability in a communication line management system, comprises the steps of organizing the test points, information on the test history of the test points, and test point search priorities (TSPs) representing the priorities of the test points in the order of high failure probability into a test database, searching the test database to determine the testing order of the test points according to the TSPs, testing the test points in the testing order to locate the failure, and revising the values of the TSPs according to the test results and the location of the failure.

According to another aspect of the present invention, there is provided a computer readable recording media storing instructions for executing a method for locating a failure of a communication line according to self-adjusted priorities of the test points in the order of high failure probability, which comprises the steps of organizing the test points, information on the test history of the test points, and test point search priorities (TSPs) representing the priorities of the test points in the order of high failure probability into a test database, searching the test database to determine the testing order of the test points according to the TSPs, testing the test points in the testing order to locate the failure, and revising the values of the data fields of the TSPs according to the test results and the location of the failure.

BRIEF DESCRIPTION OF THE DRAWINGS

The above and other objects and features of the present invention will become apparent from the following description of preferred embodiments taken in conjunction with the accompanying drawings, in which:

FIG. 2 is a diagram for illustrating the procedure for testing a dedicated communication line to deal with a failure in the inventive dedicated communication line management system;

FIGS. 3A to 3D are diagrams for illustrating the procedure of locating a failure in a dedicated communication line in the inventive dedicated communication line management system;

FIGS. 4A to 4E are diagrams for illustrating the data structure of recording the information on a dedicated communication line and its testing in the inventive dedicated communication line management system;

FIG. 5 is a flow chart for illustrating the steps of locating a failure of a communication line according to the inventive method.

PREFERRED EMBODIMENT OF THE INVENTION

Figure 1:
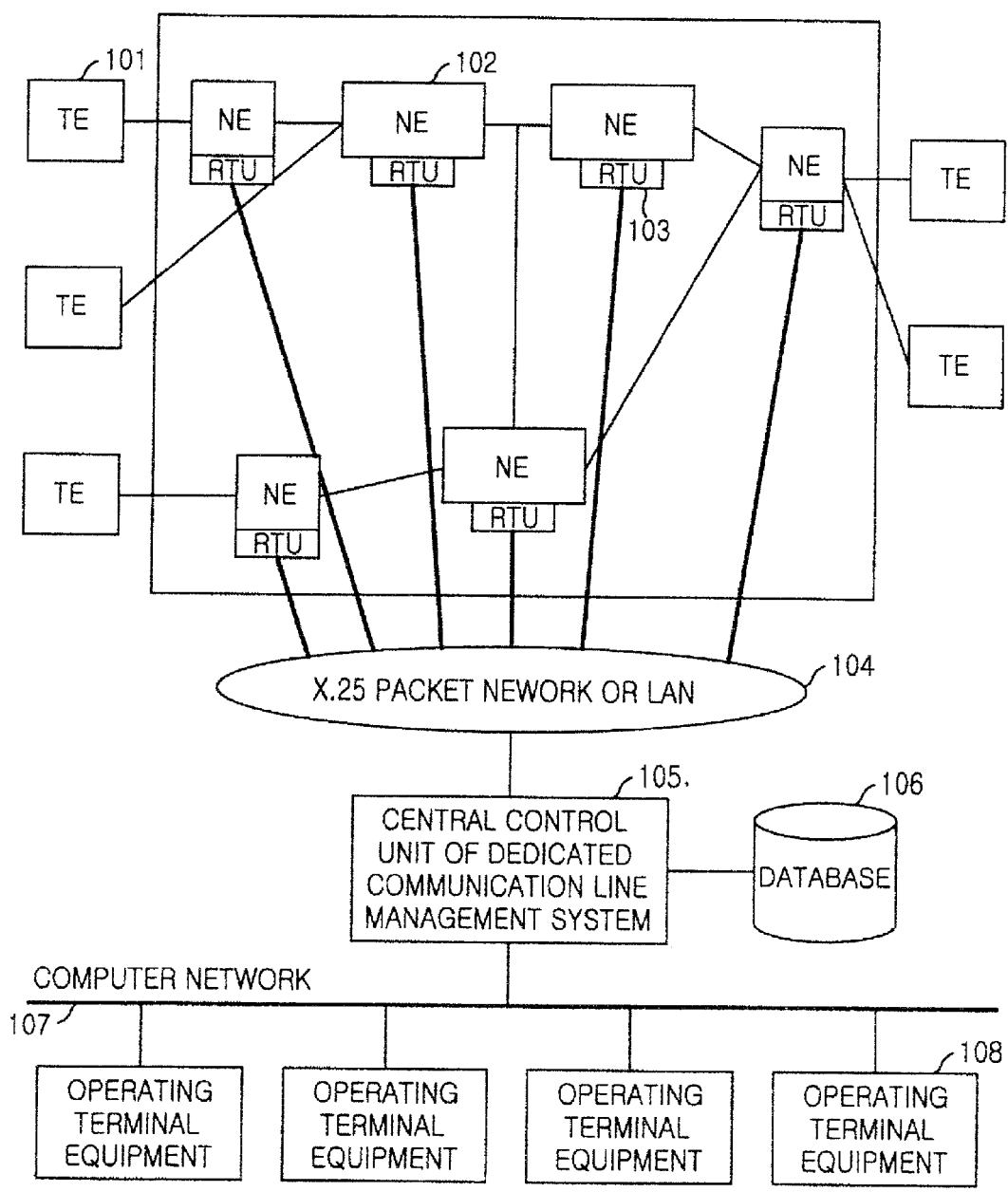
FIG. 1 is a block diagram for illustrating the structure of a dedicated communication line management system embodying the present invention.

Referring to FIG. 1, a dedicated communication line management system includes terminal equipments (TEs) 101, network elements (NEs) 102, remote test units (RTUs) 103, central control unit 105, X.25 or LAN 104 connecting RTUs with the central control unit 105, database 106, and operating terminal equipments 108 for the central control unit 105.

A dedicated communication line consists of TEs 101 connected with the dedicated communication network. The dedicated communication network comprises various NEs 102 such as MDF (Main Distribution Frame), PCM (Pulse Code Modulation), DCS (Digital Cross-connect System), etc. The RTU 103 is connected to NE 102 to monitor a dedicated communication line, and to transfer and split signals, and to perform loop-back test when there is a failure notice. It is controlled by the central control unit through X.25 packet network or LAN 104. The central control unit 105, database 106 and operating terminal equipments 108 are connected with the data communication network 107.

Referring to FIG. 2, a test server 25 connected with the database 26 performs a failure test of a dedicated communication line by detecting NE 21 and RTU 22 connected thereto and the kind of service providing for the communication line. A test point (TP) in the RTU 22 is accessed by the test server 25 through an RTU communication server 24 with the method of the X.25 or TCP/IP. The test is performed based on the service kind and prescribed testing procedure. The RTU communication server 24 serves to transfer the RTU control command and its response between RTU 22 and test server 25. The information concerning the RTU and TP connected for testing is recorded in the database 26, used for the future test. If necessary, the NE 21 could be controlled through an NE communication server 23.

Locating the failure through such testing procedure, the test server 25 sends the information of the failure and the request for repairing it through a failure repair program 27 connected with the network.

Hereinafter described is the procedure of locating a failure of a dedicated communication line in the dedicated communication line management system in connection with FIGS. 3A to 3D. In order to test a dedicated communication line should be firstly determined the service kind of the line and the features of the NE and RTU. The service kind may be VF (Voice Frequency), DDS (Digital Data Service), DS1 (Digital Signal Level 1), In this case, if the feature of the NE indicates such equipment as MDF or PCM providing a simple connection, the RTU may be directly controlled to test the line. However, if the feature indicates such equipment DCS, the test should partly use the connection function provided by the corresponding NE, so that NE and RTU are separately controlled. This requires a separate list of command for NE and RTU. When the NE should be controlled, the NE communication server 23 as shown in FIG. 2 is used.

Thus, if the service kind of the line to be tested and NE and RTU are determined, the test is performed such procedure as shown in FIGS. 3A to 3D to find the failure point according as the test results go beyond the limits set for the test items. For example, assuming the dedicated communication line to be tested involves the test points TP1, TP2 and TP3, and TP1 firstly accessed, a simple test is performed at TP1 to locate the failure by checking the level, resistance, etc. of the line. If not locating the failure at TP1, dichotomy is applied to split the test of RTU into the right and left sides of TP1. If the dichotomous test of the right or left side of TP1 shows the failure and there is no further TP in each side, it is just the failure site. However, if there in a further TP, another dichotomous loop-back test must be performed around the further TP to locate the failure.

Figure 3A:
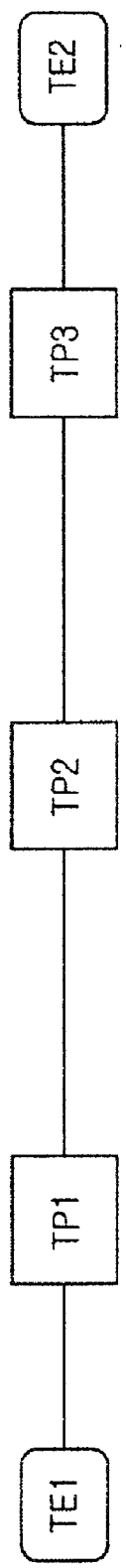
Figure 3B:
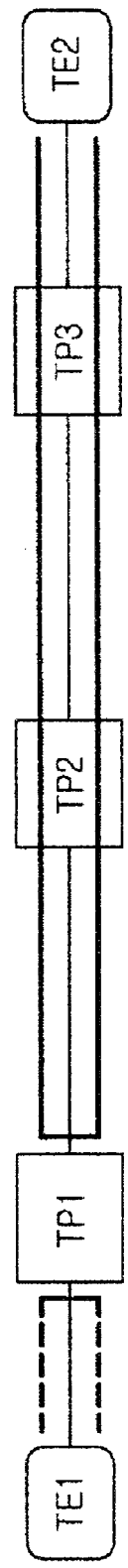

Thus, the dichotomous test is performed to the right and left sides of TP1 after the simple test, as shown in FIG. 3B. In this case, since the right side is identified with the failure shown by a solid line, TP2 is accessed to perform a simple test as shown in FIG. 3C. Then, another dichotomous test is applied to the left side interval TP1~TP2 and the right side interval TP2~TE2 of the reference test point TP2. In this case, if the failure is detected in the right side interval TP2~TE2, TP3 is accessed to finally find the failure site as shown in FIG. 3D.

Figures 4A, 4B:
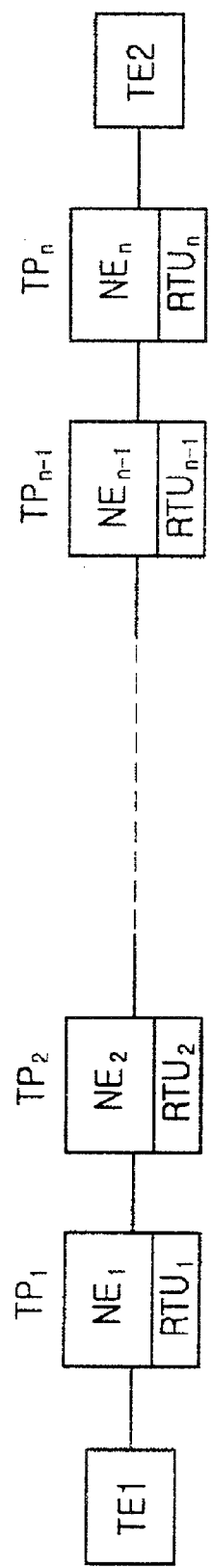

Referring to FIG. 4A, a dedicated communication line connecting TE1 and TE2 involves a plurality of network elements NE1, NE2 . . . NEn connected with their respective RTUs for testing the line. The information storage format of the line includes the fields of service kind, speed, site of TE, TSP (Test point Search Priority), etc. in FIG. 4B. The TSP field determines which TP to start a test, described in detail in connection with FIGS. 4D to 4E.

FIG. 4C illustrates storage of the TP information of the test points belonging to the NEs and RTUs involved in the dedicated communication line, which are accessed by the RTU communication server 24 as shown in FIG. 2 to perform the test. FIG. 4D illustrates storage of the number of the tests to have been performed at each TP, hereinafter referred to as test frequency number. In addition, FIG. 4E illustrates the date and time of the test most recently performed at each TP. The test frequency number and the date and time recorded serve to determine the TP to be first tested. Thus, the TP of the highest probability of failure is firstly tested, compared to the conventional dichotomous testing method, so that the time taken for testing may be minimized.

For example, the TP of the highest probability of failure may be determine by the TP that has been most frequently tested on the presumption that frequency means high probability, or otherwise by the TP that has been least frequently tested on the presumption that the least test means high probability. Likewise, it may be determined based on which TP has been most recently or least recently tested.

The TSP field of FIG. 4B stores a value representing such test history of each dedicated communication line. Hence, the TP to be first tested is determined according as the value of the TSP field is 0, 1, 2, 3 or 4. For example, the value 1 indicates the TP to have been most frequently tested, 2 least frequently tested, 3 tested most recently, and 4 least recently tested. If the value is 0, the simple dichotomous test is performed first at the test point $TP_{n/2}$. The TSP value is not always the same, but properly adjusted to the searching method with the highest probability according to the statistical results from the test history to locate the failure. This is described in detail in connection with FIG. 6.

Describing the process of locating a failure of dedicated communication line in connection wit FIG. 5, the test server fetches one of the trouble reports waiting for testing from the database at step 502 after starting the test server at 501. In addition, the information on the communication line of the trouble report is fetched at step 503 to determine the testing condition by detecting the service kind and feature of the line at step 504, and to determine one of the test points TPt to be first tested by detecting the TSP field at step 505.

As shown in FIG. 4, the TPt selected may be $TP_{(1+n)/2}$ of step 506 at the middle of "n" TPs, TP of step 507 most frequently tested, TP of step 508 least frequently tested, TP of step 509 most recently tested, or TP of 510 least recently tested according as the TSP field value is 0, 1, 2, 3 or 4. Besides, since the test must be repeated by shifting TP until locating the failure, the leftmost TP is assigned number "1", and the rightmost TP number "n",i.e., step 551.

Thereafter, TPt is accessed at step 512 through the RTU server to revise the test history thereof including the test frequency and the test date and time at step 513, and then to perform the failure test according to the prescribed rule at step 514. If the TPt presently under test is identified with the failure at 515, the failure repair is immediately requested at step 516. After step 516 completes, the test is terminated at step 517.

Or otherwise, if the left side interval of TPt is identified with the failure, the variable R representing the rightmost TP is substituted by "t" at step 518, and the next tested TPt is determined according to the formula t=(L+R)/2 at step 519. On the contrary, if the right side interval of TPt is identified with the failure, the variable L representing the leftmost TP is substituted by "t" at step 520 to determine likewise the next tested TPt, and then the failure test is repeated starting from step 512. Thus locating the failure by repeating the test, the failure repair for the trouble report is immediately requested at step 516, and thereafter the next trouble report is processed starting from step 502.

Figure 6:
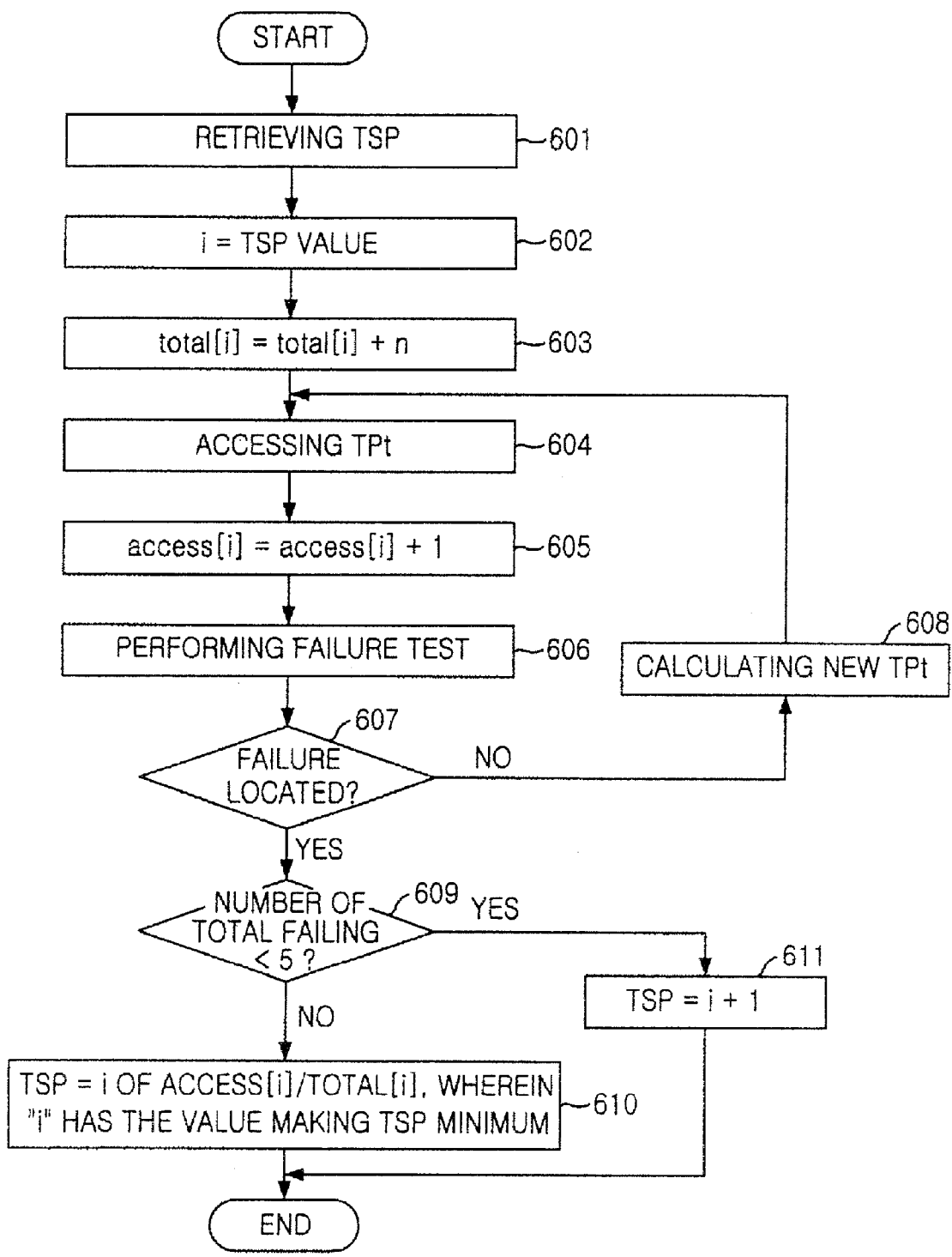
FIG. 6 is a flow chart for illustrating the steps of attaining the statistically optimum values of TSP for locating a failure in a communication line according to the inventive method.

FIG. 6 illustrates the process of best locating a failure by determining which value of the TSP field contributes to the fastest location of the failure by cumulatively managing the TSP field data.

When a dedicated communication line is first established, the TSP field is assigned "0" to apply the dichotomous testing to the line because there is no test history. Whenever automatically performing the failure test according to the TSP, the accumulated value (access[i], i=TSP value) of the TPs accessed and the accumulated value (total[i], i=TSP value) of the total TP numbers "n", are respectively stored. Then, there are produced ten additional variables related to TSP fields from access[0]/total[0] to access[4]/total[4] according to the TSP field values. Since it is impossible to compare the TSPs with each other until a sequence of five failures has been detected, the TSP field value is increased one by one to change the technique of searching failure whenever the communication line is subjected to the failure test.

Thus completing all the five kinds of searching techniques with the TSP equal to 4, the "i" as the optimum of them is selected to determine the value of TSP which is represented by the minimum value of access[i]/total[i]. Of course, the values of access[i]/total[i] are cumulatively managed to obtain the optimum technique of searching failure, automatically revising the TSP field.

Describing the procedure of obtaining the optimum technique of searching failure in more detail in connection with FIG. 6, total[i] is added with the number of the total TPs to accumulated the number of the total objective TPs through steps 602 and 603 before starting the failure test after retrieving the TSP value at step 601. Thereafter, whenever accessing a new TP at step 604, access[i] is increased one by one to perform the failure test, through steps 605 and 606. If not locating the failure at step 607, a new TPt is calculated at step 608 to return to step 604. However, if locating the failure at step 607, it is determined whether the number of total failing times is less than 5 at step 609. If equal to or greater than 5, the searching technique that located the failure through the minimum number of steps is designate for the next failure test by revising the TSP value by obtaining a value of "i" so at the value of access [i]/total [i] is minimum at step 610. However, if less than 5, the TSP value is increased by one, i.e., step 611 in order to use for the subsequent failure test the remaining one of the five searching techniques that has not yet been used for the failure test, providing them with the same chance.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for locating a failure of a communication line, which includes a network element and a remote test unit connected with a communication network, according to self-adjusted priorities of test points in the order of high failure probability in a communication line management system having a terminal, comprising the steps of:

a) organizing the test points, information on a test history of the test points, and test point search priorities (TSPs) representing the priorities of the test points in the order of high failure probability into a test database;

b) searching the test database to determined the testing order of the test points according to the TSPs, determining a service type of the communication line and features of the network element and the remote test unit;

c) testing the test points in the testing order to locate the failure by using one or more tests selected from a simple test, a dichotomous test and a dichotomous loop-back test; and d) revising values of data fields of the TSPs according to test results and the location of the failure, wherein the simple test is defined as checking a level and resistance of the test point for determining the failure.

2. The method as cited in claim 1, wherein said step a) includes the steps of:

a1) working a test server to fetch a trouble report for the failure together with information on the communication line;

a2) determining procedure of testing according to the kind and feature of service of the communication line; and a3) searching the test database to determine the test point location according to the data fields of the TSPs.

3. The method as recited in claim 1, wherein the TSPs are determined automatically depending upon which one among the test points for dichotomy, for testing the point most frequently tested, for testing the point least frequently tested, for testing the point most recently tested, and for testing the point least recently tested is selected as a starting point for locating the failure.

4. The method as recited in claim 1, wherein said step d) includes the step of: cumulatively managing the TSPs so that the highest probable TSP may be selected for locating the next failure.

5. A computer readable recording media storing instructions for executing a method for locating a failure of a communication line, which includes a network element and a remote test unit connected with a communication network, according to self-adjusted priorities of test points in the order of high failure probability, the method comprising the steps of:

a) organizing the test points, information on a test history of the test points, and test point search priorities (TSPs) representing the priorities of the test points in the order of high failure probability into a test database;

b) searching the test database to determined the testing order of the test points according to the TSPs, determining a service type of the communication line and features of the network element and the remote test unit;

c) testing the test points in the testing order to locate the failure by using a simple test, a dichotomous test and a dichotomous loop-back test; and d) revising values of data fields of the TSPs according to test results and the location of the failure, wherein the simple test is defined as checking a level and resistance of the test point for detecting the failure.

* * * * *